United States Patent [19]

Schuman et al.

[11] Patent Number: 5,338,446
[45] Date of Patent: Aug. 16, 1994

[54] FILTER UNIT FOR IN-LINE USE IN A POOL VACUUM HOSE

[75] Inventors: Michael L. Schuman, El Monte; Kenneth E. Price, Whittier, both of Calif.

[73] Assignee: Rainbow Lifegard Products, Inc., El Monte, Calif.

[21] Appl. No.: 17,465

[22] Filed: Feb. 12, 1993

[51] Int. Cl.⁵ ............................................. B01D 35/02
[52] U.S. Cl. ....................... 210/169; 210/232; 210/238; 210/239; 210/416.2; 210/445; 210/446; 210/453; 15/1.7; 4/490
[58] Field of Search ............. 210/169, 232, 239, 237, 210/238, 416.2, 445, 446, 448, 450, 453, 454; 15/1.7; 4/490

[56] References Cited

U.S. PATENT DOCUMENTS

| | | | |
|---|---|---|---|
| 2,468,328 | 4/1949 | Hill | 210/446 |
| 2,557,557 | 6/1951 | Newcum | 210/446 |
| 3,002,870 | 10/1961 | Belgarde et al. | 210/446 |
| 3,355,021 | 11/1967 | Jones | 210/446 |
| 3,701,433 | 10/1972 | Krakauer et al. | 210/446 |
| 4,166,792 | 9/1979 | Offer et al. | 210/446 |
| 4,731,178 | 3/1988 | Rosenberg | 210/446 |
| 4,988,437 | 1/1991 | Gefter et al. | 220/416.2 |
| 5,024,761 | 6/1991 | Deibel | 210/446 |
| 5,100,541 | 3/1992 | Kallenbach | 210/169 |
| 5,143,605 | 9/1992 | Masciarelli | 210/416.2 |
| 5,202,020 | 4/1993 | Desjoyaux et al. | 210/446 |

OTHER PUBLICATIONS

Rainbow Lifegard Products, Inc., one page advertisement (No date) for Leaf traps.

Primary Examiner—Peter A. Hruskoci
Assistant Examiner—Robert James Popovics
Attorney, Agent, or Firm—Christie, Parker & Hale

[57] ABSTRACT

A filter unit capable of receiving a cartridge-type filter element is provided for use in-line with a suction-type pool cleaning device. The unit has an elongated housing with intake and outlet ports at opposite ends. The intake port may be connected via a hose to a pool cleaning device and the outlet port to a suction port in the pool circulation system. The unit can use a filter cartridge with an element that offers a filtration coarseness somewhere between that of the system filter and a strainer element. The housing may be adapted to receive a strainer basket in place of the filter cartridge and thus serve as a conventional leaf-trap.

6 Claims, 4 Drawing Sheets

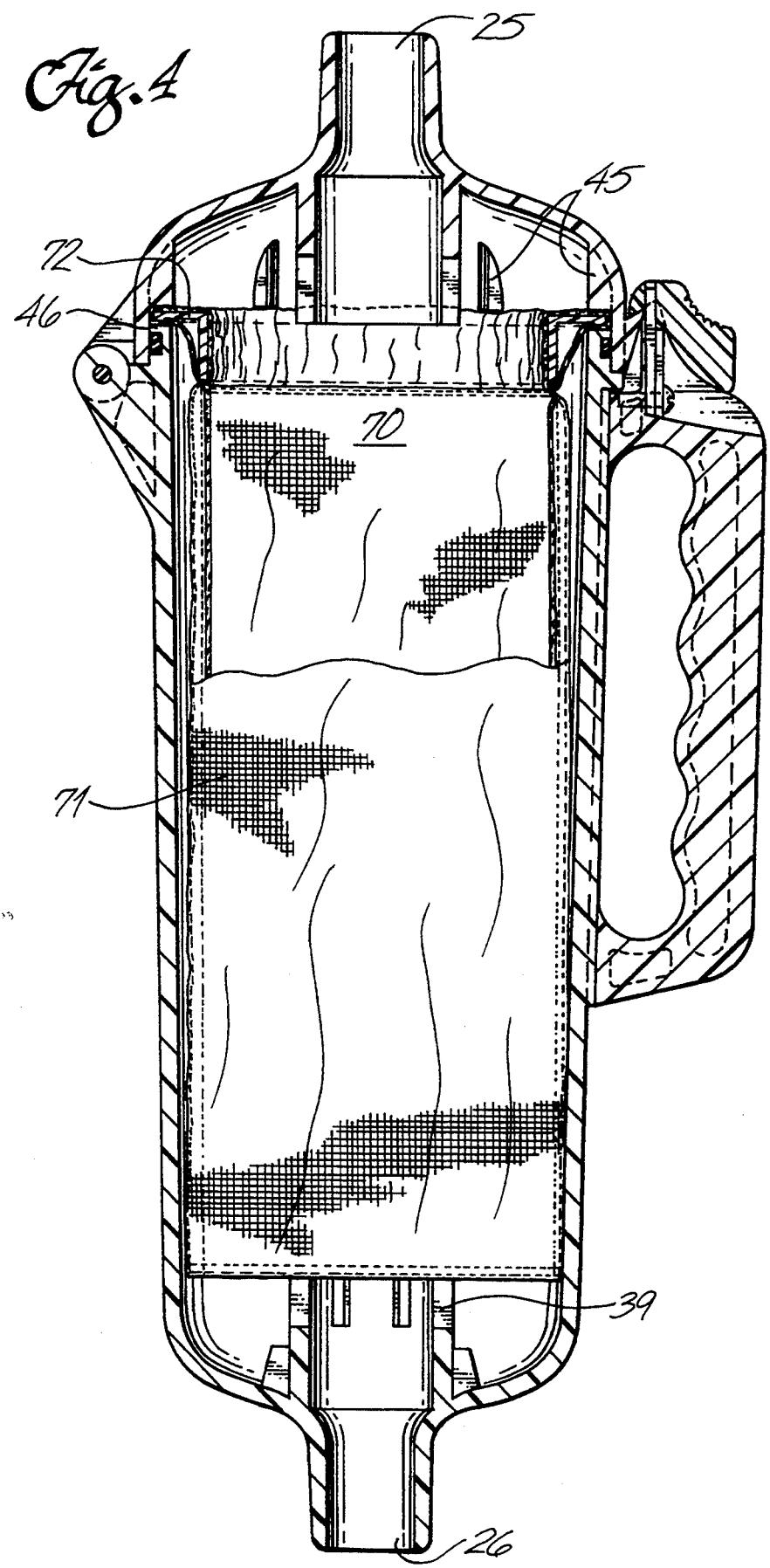

FILTER UNIT FOR IN-LINE USE IN A POOL VACUUM HOSE

BACKGROUND OF THE INVENTION

1. Field of the Invention

The invention pertains to pool cleaning equipment. More particularly it pertains to an accessory for a pool cleaning device operated by the suction of the pool's circulation system.

2. Description of the Prior Art

A swimming pool water circulation system includes the pool itself, a motor driven pump, a flow duct from the pool to the inlet or suction side of the pump, a return flow duct from the discharge or pressure side of the pump to the pool, and a system filter unit in the return flow duct. If desired, a water heater can be installed in the return duct. The system filter is of the kind which removes sand, dust and other finely divided solid matter from water passed through it; many system filters use a diatomaceous earth filtering medium. System filters are not well suited for the removal from water of larger things such as leaves, flower petals, pine needles and the like. Therefore, it is now common to equip swimming pools with skimmers for the removal from water entering the return flow duct to the pump of leaves and the like, which things often float on the surface of the pool.

A typical skimmer, according to prevailing design philosophy, defines a vertically elongate chamber which has a lower basket portion, a central plenum portion, and an upper chimney portion which is closed by a removable cover. A foraminous basket, having a selected pore size, is supported across the top of the basket cavity so the bottom of the basket is above the bottom of the cavity. A throat extends laterally from the plenum to a principal inlet opening to the skimmer; that opening is square or rectangular and is defined in a vertical plane. A coupling for a flow pipe, and often two such couplings, is located at the bottom of the basket cavity of the skimmer. The skimmer is built into the pool so that the throat inlet opening is centered at the optimum water level in the pool, which level normally varies one to two inches or so above and below the optimum level; the opening is sufficiently high to encompass this range of water levels. The cover for the skimmer chimney is placed flush with a deck or other surface around the pool. The throat is partially submerged if the pool is properly filled, and so the skimmer basket cavity and the lower part of the plenum are filled with water when the pool is filled. A buoyant weir plate, having a pivotal connection at its bottom to the inlet throat, often is mounted across the throat to cause only water immediately at and below the pool surface to flow over the weir and into the skimmer plenum.

The flow duct from the pool to the suction side of the pool circulation pump is connected to the bottom of the basket cavity. When the pump is operated, it takes in water from the skimmer. The water enters the skimmer from the pool through the throat, carrying with it leaves and the like which float on the water surface in the vicinity of the throat opening. Water entering the skimmer via the throat passes through the basket where the leaves and other large things are strained out by the basket. Thus, water passing to the pump is free of large pieces of debris, and the filter is better able to do for a longer period the task assigned to the filter. Debris collected in the skimmer basket is easily dealt with by removing the skimmer cover, removing the basket via the chimney, emptying the basket of collected debris, and replacing the basket.

Pool cleaning devices which operate on pump suction are also known; they include vacuum heads which are coupled to long poles and are moved manually across the pool bottom, and they also include automatic devices which move across the pool bottom—the former are used for short periods, whereas the latter can be operated for long periods measured in hours or days. Such devices are coupled by flexible suction hoses to the circulation pump inlet via the pool skimmer; they operate to suck from the pool bottom accumulations of dirt, leaves and the like, and to introduce them to the pool filter for removal there.

As noted, suction pool cleaners are operated by connection to the suction-side of a pool circulation pump by connection of a suction hose to the pool skimmer. The suction hoses commonly used, while flexible, are not readily bent sharply at right angles. Therefore, such hoses often are coupled to the pool-to-pump return line via the skimmer through the top of the skimmer, i. e., through the skimmer chimney upon removal of the chimney cover. In other instances, the suction hose can be connected to the pool-to-pump suction line through the skimmer throat. Such connections are made either after removal of the skimmer basket (in which case the coarse straining function of the basket is lost) or to special connections inside the skimmer which preserve the function of the basket. In other instances, the hose may be connected to a special port defined adjacent the skimmer throat opening in a side wall of the pool. This can be done where a specially designed skimmer has been built into the pool. However, very few pool skimmers having such special hose connection features now exist.

In equipment where the skimmer basket is removed to connect the suction hose, or where there is a hose port which bypasses the basket, the coarse straining function is lost while the cleaning apparatus is in use. To solve this problem, a product known as a leaf trap is available. This product is configured to fit in-line in the hose between the cleaning implement and the suction port and duplicates the function of the skimmer basket. A perforated basket or a mesh bag having an annular flange is held in a cylindrical housing which has ports at either end. Water coming through a hose from the cleaning implement passes through the intake port into the basket or bag for capture of entrained debris by the basket or bag before the water then flows through the outlet to the suction port. The leaf trap may have neutral buoyancy, or approximately so.

Even with the use of a leaf trap, a number of problems are presented by the use of suction powered pool cleaning apparatus. A primary function of the cleaning is to remove accumulations of dust, sand, fine pebbles etc. from the pool bottom. Accordingly, during the cleaning, large amounts of particulate matter of a size smaller than the mesh of the leaf trap basket or bag will be introduced to the system filter. This will tend to shorten the life of the system filter medium which is often difficult to replace or to clean, as by back washing. The types of particles that settle to the pool bottom are typically larger than the suspended particles that the system filter normally addresses, thus exacerbating the situation. This may be especially significant in areas that are naturally dusty or subject to particulate pollution from industrial or vehicular sources. There may be special situations where large amounts of such material as sand and small pebbles are introduced to the pool by a sandstorm or by being tracked in by individuals.

SUMMARY OF THE INVENTION

In the present invention, an in-line cartridge-type filter unit is provided for use with a pool cleaning device. An elongated housing has intake and outlet ports at opposite ends. The intake port may be connected via a hose to a pool cleaning device and the outlet port to a suction port in the pool circulation system. The unit can use a filter cartridge with an element that offers a filtration coarseness equal to, greater than or less than that of the system filter.

The housing may be adapted to receive a strainer basket or mesh bag and thus serve as a conventional leaf trap. This facilitates selective use of the cartridge element when conditions warrant it (large accumulation of sand after a sandstorm vs. use on leaves in the fall). Even a customer who always uses the unit in a single configuration may benefit, as manufacturing costs may be lowered by the economies of scale in producing one type of housing instead of two.

DESCRIPTION OF THE DRAWINGS

The above-mentioned and other features of this invention are more fully set forth in the following detailed description of the presently preferred and other embodiments of this invention; such description is presented with reference to the accompanying drawings wherein:

FIG. 4 is a cross-sectional side elevation view of a filter unit according to one embodiment of the invention as adapted for use with a bag-type filter element and configured for use with smaller hoses than the unit of FIGS. 2 and 3.

DESCRIPTION OF THE ILLUSTRATED EMBODIMENTS

Figure 1:
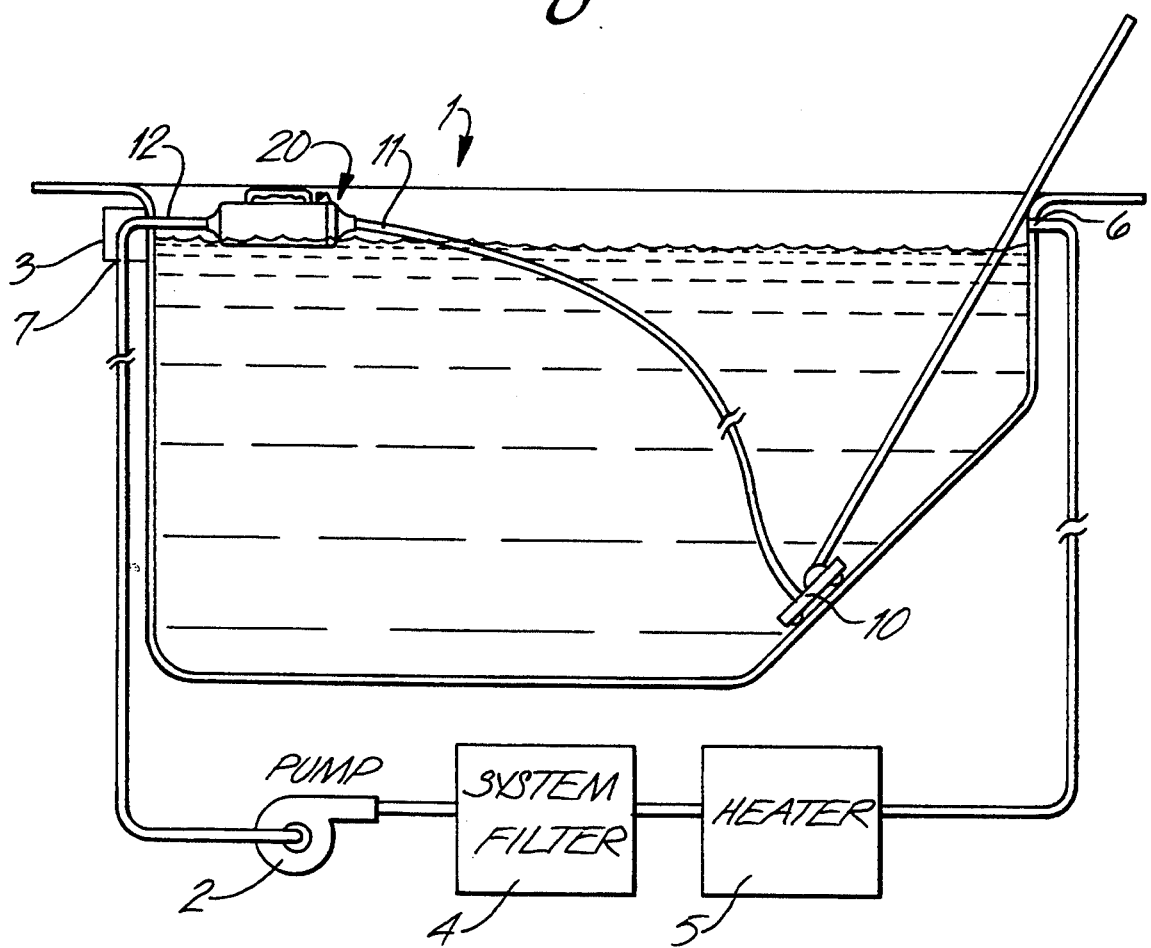
FIG. 1 is a partially schematic depiction of a typical pool circulation system with a suction cleaning apparatus and in-line filter unit.

A typical swimming pool circulation system is depicted in FIG. 1. Pool 1 has a pump 2 which draws water from the pool via skimmer 3. The water is then pumped through a system filter 4 and a heater 5 and then back to the pool via return 6. A suction operated cleaning device 10 is connected via hose 11 to the intake nipple of a filter unit 20 which has an outlet nipple connected via hose 12 to suction port 7 which is located in the skimmer.

Figure 2:
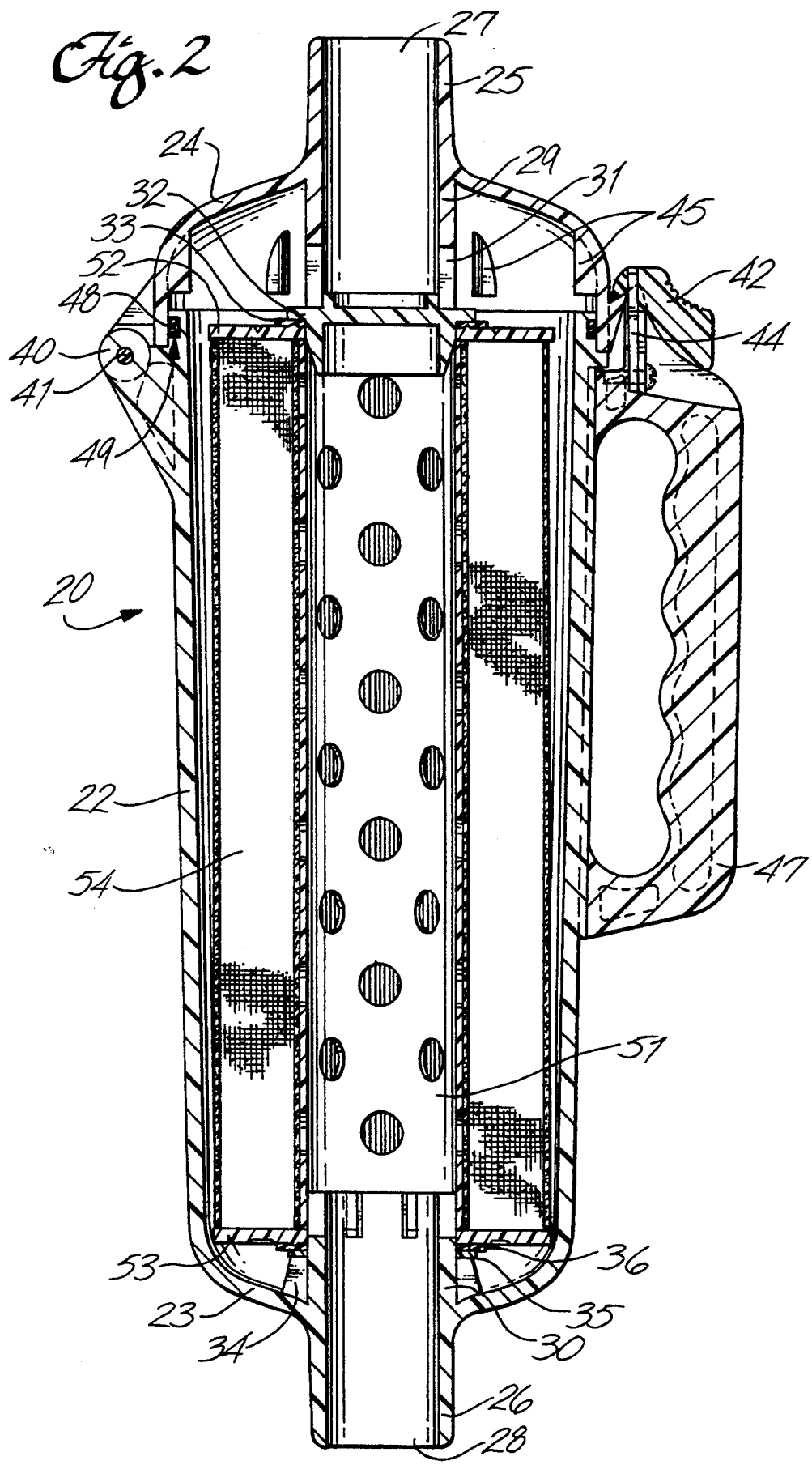
FIG. 2 is a cross-sectional side elevation view of a filter unit according to one embodiment of the invention with a cartridge type filter element.

FIG. 2 shows a filter unit 20, which comprises a cartridge-type filter element 50 and a housing 21. The filter element includes a perforated core sleeve 51, end caps 52, 53 and a filtration medium 54 which preferably consists of a pleat-folded sheet fabric of woven or nonwoven filter medium disposed around the core. For ease of use, it is preferred that a filter unit according to this invention not have a high negative buoyancy. Therefore, the housing is preferably constructed of a low specific gravity material such as molded ABS resin. The housing preferably has a tubular body 22 with preferably integral discharge end 23 and an openable cover 24 at an opposite intake end of the body. Intake and outlet nipples 25 and 26 are formed in the cover and body discharge ends, respectively, and bound respective inlet and outlet ports 27 and 28. The nipples can be about two inches in diameter for use with end fittings of two inch hoses of the kind commonly used with pool cleaning accessories. Intake and outlet tubes 29 and 30 extend inward from the respective ports 27, 28. The intake tube has lateral openings 31 in it preferably at its end inwardly of the cover from nipple 25. A plug 32 bearing elastomeric washer 33 fits removably into the inner end of the intake tube.

The outlet tube 30 bears external radial ribs 34 over a portion of its length adjacent to and extending into body 22 from the body discharge end 23. A support washer 35 fits around the outlet tube and sits against the ribs to be supported by the ribs. A second elastomeric washer 36 can be carried by the support washer. Filter cartridge 50 can be placed in the housing with one end of its tubular core 51 fitting over the inner end of the outlet tube 30 and against the support washer 35, while the other core end is capped by the plug 32, with the elastomeric washers 33, 36 at each end producing a resilient seal to the adjacent filter cartridge end cap.

Hinge 40 with preferably plastic axle pin 41 and a thumb-operable latch 42 with spring 44 secure the cover in place in water tight relation to the body intake end. A handle 47 preferably is attached to the exterior of the housing to facilitate transport. The cover, when closed, is sealed to the housing body via an O-ring 48 which is carried in a groove 49 in the outer surface of body 22 closely adjacent its intake end.

Filter unit 20 is connected to the cleaning device 10 and to suction port 7 via hoses 11 and 12 which fit over the respective intake and outlet nipples 25, 26. In operation, water is drawn axially through intake port 27 then radially outwardly through the openings 31 in the intake tube; in this usage of the filter unit the inner end of tube 29 is closed by plug 32. The water flow path proceeds to the outer periphery of filter element 50 and then radially inwardly through the filter medium 54 into the filter core 51, whereupon it exits axially through the outlet port in a filtered state.

Figure 3:
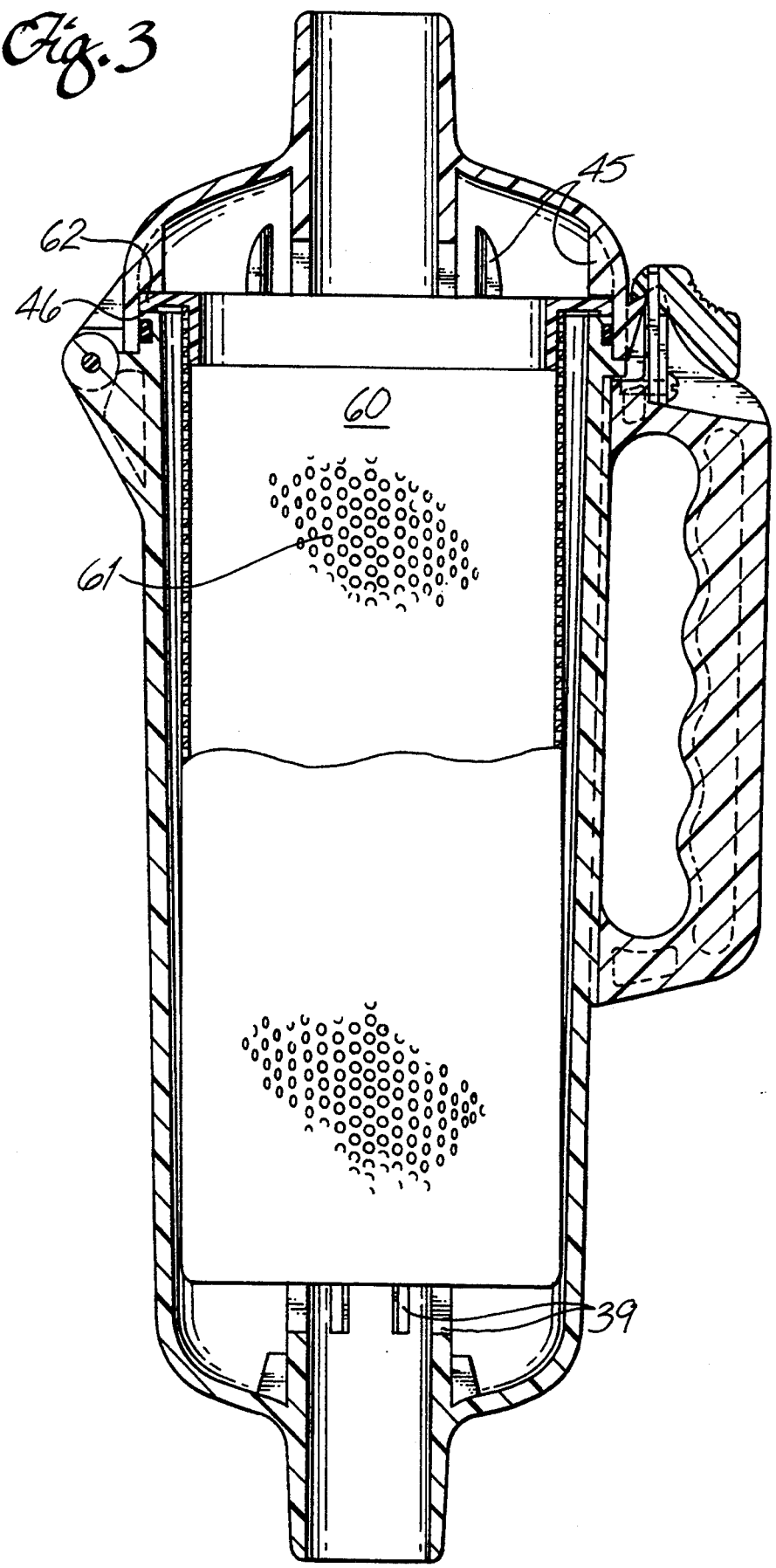
FIG. 3 is a cross-sectional side elevation view of the filter unit of FIG. 2 as adapted for use with a basket-type filter element.

As shown in FIG. 3, the filter unit 29 may be used with a strainer basket element 60 having a perforated body 61 and an annular flange 62 about the open end of the basket. Cover-ribs 45 inside the cover preferably are provided to hold the flange 62 against an upper rim 46 of the housing body 22. In such a case the plug 32 may be removed from the intake tube 29 to permit axial flow of water straight from intake port 27 into the strainer basket. The outlet tube 30 has lateral openings 39, preferably at the end of the tube inwardly of the discharge end 23. The openings permit the use of a strainer basket element 60 of such large size that the element may contact or come into close proximity with the outlet tube 30. The openings permit flow out through the periphery of the perforated body 61 to pass through the openings 39 and exit through the outlet tube 30.

As shown in FIG. 4, the filter unit 20 may be used with a strainer bag element 70 having a mesh bag 71 of suitable pore size and annular mounting flange fixture 72 about the open end of the bag. It is similarly situated in the housing and functions in the same manner as does the basket 60 while providing a finer straining function. As shown, the nipples 25 and 26 are configured for use with smaller diameter hoses 11 and 12 than are used with the filter unit of FIGS. 2 and 3 (one and one half inch hoses as opposed to two inches for the embodiment in FIGS. 2 and 3).

From the foregoing description, the advantages of the present invention are readily apparent. The filter unit is simple to use and helps preserve the life of the system filter. The use of a hinged cover and thumb-operable latch provide quick and easy access to the interior of the filter unit. This permits easy removal and cleaning of the filter cartridge or strainer basket or bag, as well as facilitating their interchange.

The foregoing description of this invention is not an exhaustive catalog of all the ways in which the invention can be practiced in structural or procedural contexts. Rather, the description is illustrative and exemplary. Workers skilled in the art to which the invention pertains will recognize and readily appreciate that other arrangements are possible within the fair scope of the invention and by which the advances made possible by the invention can be achieved. Therefore, the following claims are to be read, where proper, as having application to both those things described above and shown in the drawings, and those other things which, while not expressly described, are within the fair scope of the invention according to the principles of equivalence.

What is claimed is:

1. An axial flow filter unit for use in-line between a first hose from a pool cleaning implement and a second hose to a water flow line for a circulating pump, the filter unit comprising:
   an elongated filter housing including:
      intake and outlet ports located at opposite ends of the housing for communication with said first and second hoses, respectively; and,
      flow directing means for removeably supporting a radial-flow hollow-core cartridge filter element in the housing for flow of liquid from the intake port radially inwardly through a supported filter element and from the filter element axially through the outlet port, the flow directing means being defined to selectively enable basket and bag filter elements to be supported in the housing and to occupy space therein otherwise occupied by a cartridge filter element.

2. An axial flow filter unit for use in-line between a first hose from a pool cleaning equipment and a second hose to a water flow line for a circulating pump, the filter unit comprising:
   an elongated filter housing including:
      intake and outlet ports located at opposite ends of the housing for communication with said first and second hoses, respectively, a cylindrical sleeve defining the outlet port at one end thereof, and a cover releaseably securable to the other end of the sleeve and defining the inlet port, the intake and outlet ports including nipples on the exterior of the housing to which hoses can be connected; and
      flow directing means for removeably supporting a radial-flow hollow-core cartridge filter element in the housing for flow of liquid from the intake port radially inwardly through a supported filter element and from the filter element axially through the outlet port, the flow directing means including an outlet tube within the sleeve at the outlet port for supporting connection to one end of a core of a cartridge filter element, an intake tube open within the cover at the intake port having lateral openings in it, and a plug member connectable between said intake tube and the other end of the core of a cartridge filter element in a sealing relation to the core.

3. The filter unit of claim 2, wherein the housing sleeve has a rim and the cover is defined for clamping to the sleeve rim an annular end portion of a basket or a bag filter element.

4. The filter unit of claim 3, wherein the outlet tube has lateral openings.

5. An axial flow filter unit useful in-line in a hose connection in a swimming pool between a suction-powered pool cleaning device and a suction line from the pool to a pool water circulation pump, the filter unit comprising an elongate closeable housing having inlet and outlet hose connection nipples at its opposite ends in association with inlet and outlet ports to and from the housing, and filter element mounting means in the housing configured for mounting in the housing at different times a selected one of a radial-flow hollow-core cartridge filter element, a basket filter element having an annular flange about an open end thereof, and a bag filter element having an annular mounting feature about an open end thereof.

6. A pool cleaning system comprising:
   a suction operated cleaning device;
   a filter unit;
   a first hose for coupling the cleaning device to the filter unit;
   a circulating pump; and
   a second hose for coupling the filter unit to the circulating pump,
   wherein said filter unit comprises a selectively closeable elongated filter housing including:
   intake and outlet ports located at opposite ends of the housing for communication with said first and second hoses, respectively; and
   flow directing means for removeably supporting a radial-flow hollow-core cartridge filter element in the housing for flow of liquid from the intake port radially inwardly through the filter element and from the filter element axially through the outlet port.

* * * * *